(12) United States Patent
Sabisch

(10) Patent No.: US 6,320,761 B1
(45) Date of Patent: Nov. 20, 2001

(54) FASTENING DEVICE FOR A HOUSING

(75) Inventor: Willy Sabisch, Kümmersbruck (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/308,531

(22) PCT Filed: Nov. 7, 1997

(86) PCT No.: PCT/DE97/02602

§ 371 Date: May 18, 1999

§ 102(e) Date: May 18, 1999

(87) PCT Pub. No.: WO98/23003

PCT Pub. Date: May 28, 1998

(30) Foreign Application Priority Data

Nov. 20, 1996 (DE) .......................................... 296 20 226 U

(51) Int. Cl.⁷ ...................................................... H05K 7/02
(52) U.S. Cl. ........................ 361/807; 361/752; 361/758; 361/796; 361/801
(58) Field of Search .................................. 361/758, 752, 361/730, 801, 807, 796; 317/101; 174/394, 388, 52 R

(56) References Cited

U.S. PATENT DOCUMENTS

| 3,729,657 | * | 4/1973 | Callan et al. ................. 317/101 DH |
| 3,751,575 | * | 8/1973 | Barb ................................. 174/52 R |
| 4,039,900 | * | 8/1977 | Roback et al. ....................... 361/388 |
| 4,084,214 | * | 4/1978 | Eppich ................................ 361/394 |

FOREIGN PATENT DOCUMENTS

| 70 20 892 | 11/1970 | (DE) . |
| 72 37 274 | 1/1973 | (DE) . |
| 26 60 971 | 7/1977 | (DE) . |
| 31 49 310 | 6/1983 | (DE) . |
| 91 10 337 | 2/1993 | (DE) . |
| 93 01 558 | 5/1993 | (DE) . |

* cited by examiner

*Primary Examiner*—Jeffrey Gaffin
*Assistant Examiner*—Thanh Y. Tran
(74) *Attorney, Agent, or Firm*—Kenyon & Kenyon

(57) ABSTRACT

An attachment device for a housing is provided which is suitable for snapping onto a hat rail which is attached to a plate, and allows screw attachment to a plate. The housing base has a bevelled area on one side of a snap-action device and, in this area, screw eyelets are intgrated in a spacer which is arranged resiliently on the housing base. Said spacer is supported on the plate when screwed together.

1 Claim, 1 Drawing Sheet

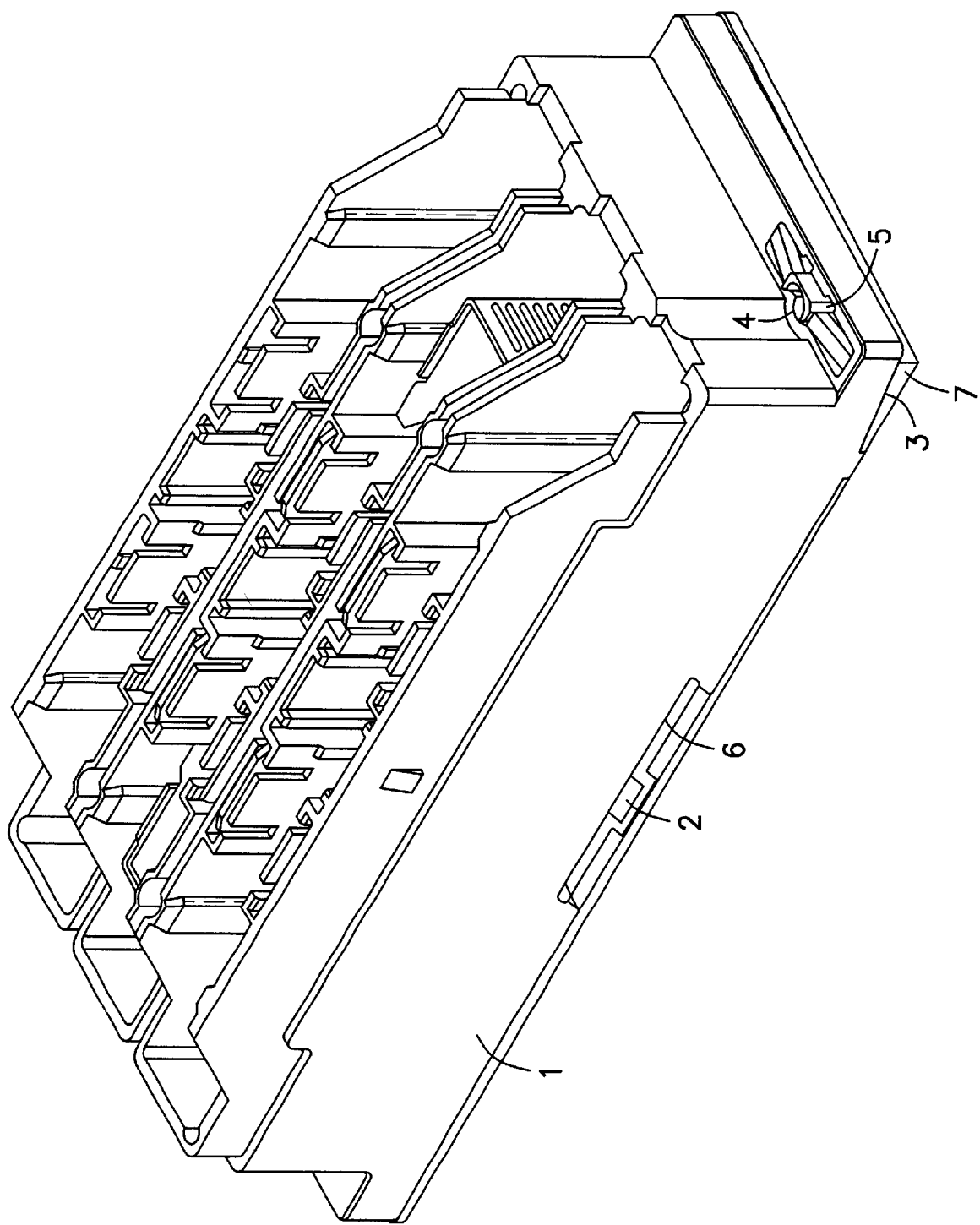

FASTENING DEVICE FOR A HOUSING

FIELD OF THE INVENTION

The present invention relates to an attachment device for a housing, having a snap-action device for snapping onto a hat rail, and having screw eyelets, which are formed integrally on the housing base, for attachment to a plate.

BACKGROUND INFORMATION

An attachment device is described in German Patent No. DE 31 49 310. This reference describes the attachment of electrical installation appliances on profiled hat rails, for which purpose slides are provided which are guided in the housing of the installation appliance and are pressed resiliently inward are provided. The inwardly facing ends of these slides are each provided with a lug which engages behind the profiled hat rail. The hat rail is arranged in a free standing position, so that even relatively high appliances can be attached to the hat rail.

German Patent No. DE 91 10 337 U1 describes an attachment device having a snap-action device for snapping onto a hat rail. Screw eyelets for attachment to a plate are provided on a housing base. On the underside of the housing base, the snap-action device has a latching lug with a beveled area which attaches to the hat rail.

SUMMARY

An object of the present invention is to provide an attachment device which allows an attachment device on high housings to be snapped onto a hat rail which is mounted on a plate and, at the same time, also allows screw attachment of the housing.

According to the present invention, this object is achieved by the fact that the underside of the housing base has a bevelled area at least on one side of the snap-action device, and that the screw eyelets, in this area, are each integrated in a spacer which is arranged resiliently on the housing base and when screwed together is supported on the plate.

BRIEF DESCRIPTION OF THE DRAWING

The FIGURE shows an attachment device for a housing in accordance with an exemplary embodiment of the present invention.

DETAILED DESCRIPTION

The FIGURE shows a housing 1 with a snap-action device 2 for snapping onto a hat rail. The underside of the housing base is provided with a bevelled area 3 on one side of the snap-action device 2, so that the relatively high housing can also be snapped onto a hat rail 6 which is mounted on a plate. In the bevelled area 3 there is at least one screw eyelet 4 which is integrated in a spacer 5 arranged resiliently on the appliance base. When screwed onto a plate 7, this spacer 5 moves resiliently toward the plate 7 and is supported against the latter. Without this resilient spacer 5, the gap between plate 7 and housing base resulting from the bevel would cause the housing to break up at this location owing to the lever action.

The present invention allows the same appliance, even with a relatively great structural height, to be attached to a hat rail which is mounted on a plate and, if necessary, also to carry out screw attachment to a plate.

Although the present invention is explained with reference to the embodiment illustrated in the appended drawing, it should be borne in mind that this is not intended to limit the invention only to the embodiment illustrated, but rather to include all possible amendments, modifications and equivalent arrangements.

What is claimed is:

1. An attachment device for a housing, comprising:

a snap-action device for snapping onto a hat rail; and screw eyelets formed integrally on a base of the housing for attachment to a plate, an underside of the base of the housing having a bevelled area with an inside edge and an outside edge at least on one side of the snap-action device, wherein, in a fitted position of the housing, the outside edge is a greater distance from a plane of the plate than the inside edge, the screw eyelets being integrated in a spacer which is resiliently arranged on the base of the housing, the screw eyelets further being supported on the plate when the plate is screwed to the housing.

* * * * *